Jackson Harrington's Improvement in
Instrument for Seeding Raisins.
No. 119,704. Patented Oct. 10, 1871.
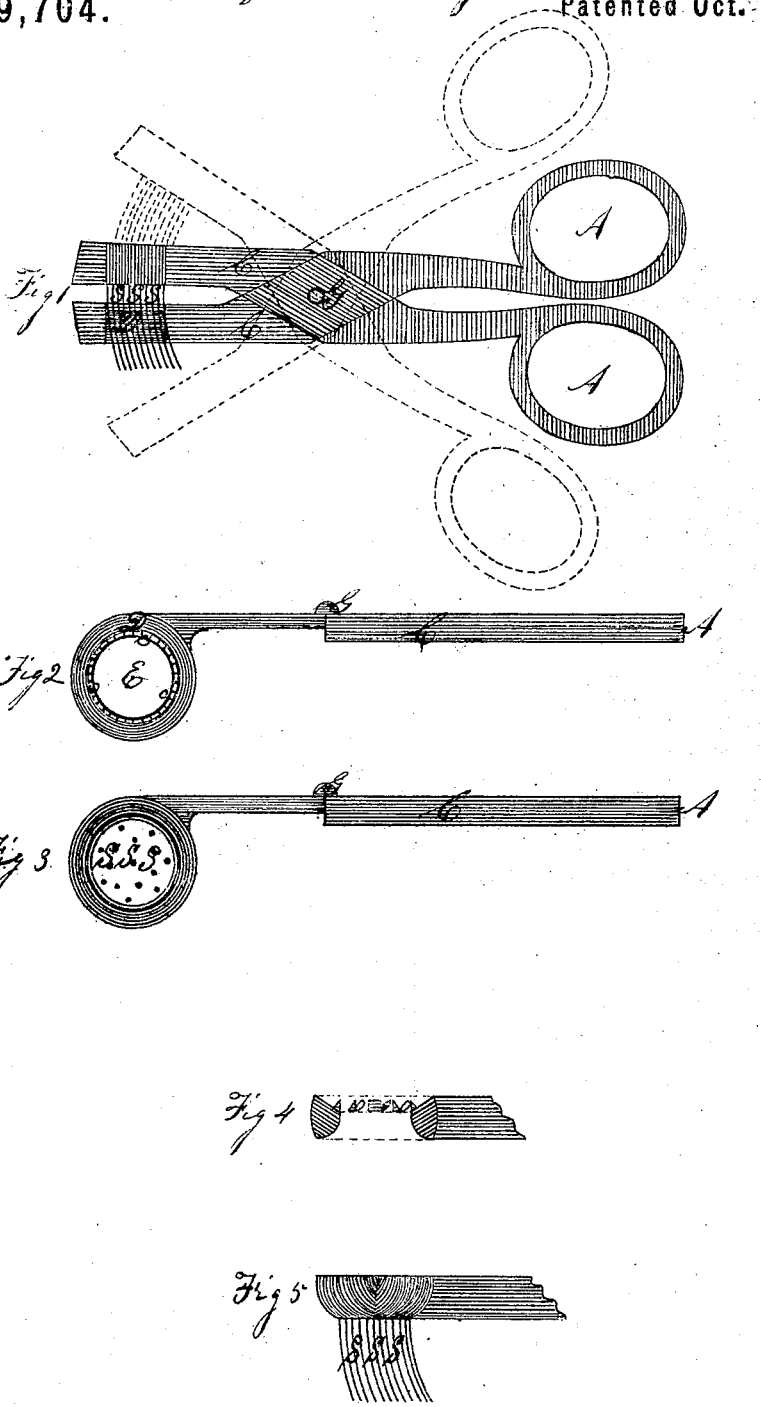
Witnesses
John Danforth
Ralph Wheeler
Inventor
Jackson Harrington

UNITED STATES PATENT OFFICE.

JACKSON HARRINGTON, OF NEW LONDON, CONNECTICUT, ASSIGNOR TO HIMSELF AND RALPH WHEELER, OF SAME PLACE.

IMPROVEMENT IN RAISIN-SEEDERS.

Specification forming part of Letters Patent No. 119,704, dated October 10, 1871; antedated September 30, 1871.

*To all whom it may concern:*

Be it known that I, JACKSON HARRINGTON, of the town and county of New London and State of Connecticut, have invented certain Improvements in Instruments for Seeding Raisins, of which the following is a specification:

The nature of my invention consists in providing two bows and shanks, resembling the bows and shanks of the ordinary shears, with a concave cup, having an aperture in its bottom, attached to the outer end of one shank, and with a number of needles fixed in the outer end of the other shanks, so that the closing of the bows will pass the needles through the bottom of the cup. The cup should be of proper size and form for holding a raisin dropped upon it, and the aperture in its bottom sufficiently large to allow the seeds to be passed through it. Around the edge of the aperture are a number of sharp teeth to hold the raisin for seeding. The needles are of such number and strength that the seeds will not be jammed between them, and of such length that they will carry the seeds entirely free from the raisin. The shanks and bows are of any convenient size, and may be so shaped and riveted that the ends of the shanks will not approach so close together as to crush the raisin.

In the accompanying drawing, Figure 1 is a side view of the instrument. Fig. 2 is a top view of the shank holding the concave cup. Fig. 3 is top view of the shank holding the seeding-needles. Fig. 4 is a section on a line of Fig. 2. Fig. 5 is a section on a line of Fig. 3.

A A are the bows, and C C the shanks of the instrument, and G the rivet holding the parts together. D is the concave cup, with aperture E and teeth *o o o* around the aperture. *s s s* are the seeding-needles.

In use the instrument is held open with the thumb and finger of one hand, while with the other hand the raisin is dropped upon the cup. Upon closing the bows the seeds are entirely removed from the raisin without wasting any of its flesh. The raisin is drawn from the needles by the hand as the shanks are again opened.

I claim as my invention—

The combination of the bows A A and the shanks C C with the seeding-needles *s s s* and the concave cup D, all constructed and arranged substantially as herein shown and described, and for the purposes set forth.

JACKSON HARRINGTON.

Witnesses:
 JOHN DANFORTH,
 RALPH WHEELER.